United States Patent
Mizon et al.

(10) Patent No.: US 7,540,820 B2
(45) Date of Patent: Jun. 2, 2009

(54) TWO-SPEED TRANSFER CASE WITH BALLRAMP CLUTCH ACTUATOR

(75) Inventors: Richard Mizon, Fayetteville, NY (US); James S. Brissenden, Baldwinsville, NY (US)

(73) Assignee: Magna Powertrain USA, Inc., Troy, MI (US)

( * ) Notice: Subject to any disclaimer, the term of this patent is extended or adjusted under 35 U.S.C. 154(b) by 391 days.

(21) Appl. No.: 11/509,751

(22) Filed: Aug. 24, 2006

(65) Prior Publication Data

US 2007/0049451 A1   Mar. 1, 2007

Related U.S. Application Data

(60) Provisional application No. 60/713,542, filed on Sep. 1, 2005.

(51) Int. Cl.
*F16H 37/08* (2006.01)
*B60K 17/35* (2006.01)

(52) U.S. Cl. .................. 475/204; 180/249

(58) Field of Classification Search ........... 192/84.4, 192/84.7, 48.5, 93 R; 475/249, 252, 204; 180/248, 249, 25
See application file for complete search history.

(56) References Cited

U.S. PATENT DOCUMENTS

| | | | |
|---|---|---|---|
| 4,805,486 A | 2/1989 | Hagiwara et al. |
| 4,895,236 A | 1/1990 | Sakakibara et al. |
| 4,950,214 A | 8/1990 | Botterill |
| 5,007,886 A | 4/1991 | Holmquist et al. |
| 5,080,640 A | 1/1992 | Botterill |
| 5,323,871 A | 6/1994 | Wilson et al. |
| 5,352,164 A | 10/1994 | Bensinger et al. |
| 5,363,938 A | 11/1994 | Wilson et al. |
| 5,407,024 A | 4/1995 | Watson et al. |
| 5,423,235 A | 6/1995 | Botterill et al. |
| 5,520,590 A | 5/1996 | Showalter et al. |
| 5,522,776 A | 6/1996 | Alvey |
| 5,655,986 A | 8/1997 | Wilson et al. |
| 5,771,477 A | 6/1998 | Showalter et al. |
| 6,001,041 A | 12/1999 | Sawase et al. |
| 6,099,430 A | 8/2000 | Winks |

(Continued)

FOREIGN PATENT DOCUMENTS

DE   3908478 A1   10/1989

(Continued)

*Primary Examiner*—Roger L Pang
*Assistant Examiner*—Derek D Knight
(74) *Attorney, Agent, or Firm*—Harness, Dickey & Pierce, P.L.C.

(57) ABSTRACT

A transfer case is provided with a range unit, an interaxle differential, a clutch assembly and a power-operated actuation mechanism. The range unit includes a planetary gearset driven by an input shaft, and a synchronized dog clutch assembly for releasably coupling one of the input shaft or an output component of the planetary gearset to an input member of the interaxle differential. The interaxle differential further includes a first output member driving a first output shaft, a second output member operably driving a second output shaft. The clutch assembly is a multi-plate friction clutch operably disposed between the first and second output shafts. The power-operated actuation mechanism includes a range actuator assembly, a clutch actuator assembly and a motor assembly operable to control coordinated actuation of the range actuator assembly and the clutch actuator assembly.

26 Claims, 7 Drawing Sheets

U.S. PATENT DOCUMENTS

| | | |
|---|---|---|
| 6,173,624 B1 | 1/2001 | Decker |
| 6,203,465 B1 | 3/2001 | Showalter |
| 6,230,577 B1 | 5/2001 | Showalter et al. |
| 6,296,590 B1 | 10/2001 | Gassmann |
| 6,367,344 B1 | 4/2002 | Vogt et al. |
| 6,398,686 B1 | 6/2002 | Irwin |
| 6,405,822 B1 | 6/2002 | Lee |
| 6,484,857 B2 | 11/2002 | Vonnegut et al. |
| 6,503,167 B1 | 1/2003 | Sturm |
| 6,568,519 B2 | 5/2003 | Lovatt |
| 6,645,109 B2 * | 11/2003 | Williams et al. ............ 180/248 |
| 6,783,475 B2 | 8/2004 | Gazyakan et al. |
| 6,802,794 B2 | 10/2004 | Showalter |
| 6,905,436 B2 | 6/2005 | Mueller et al. |
| 6,929,577 B2 | 8/2005 | Mueller et al. |
| 7,081,064 B2 | 7/2006 | Mueller et al. |
| 2002/0142877 A1 | 10/2002 | Williams et al. |
| 2003/0192401 A1 | 10/2003 | Thomas et al. |
| 2004/0163916 A1 * | 8/2004 | Showalter ................. 192/48.5 |

FOREIGN PATENT DOCUMENTS

| | | |
|---|---|---|
| JP | 2-18117 | 1/1990 |
| JP | 3-66927 | 3/1999 |

* cited by examiner

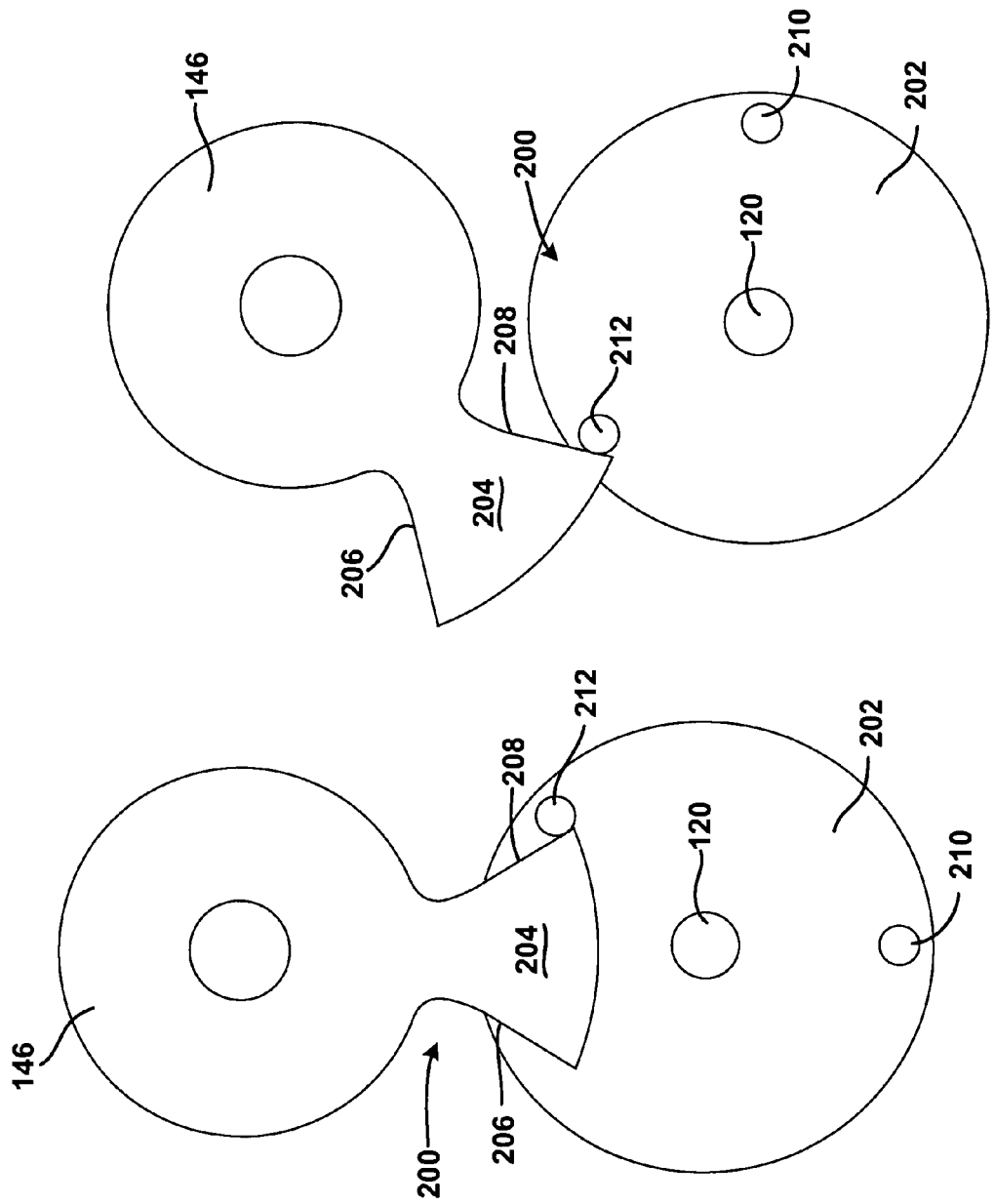

TWO-SPEED TRANSFER CASE WITH BALLRAMP CLUTCH ACTUATOR

CROSS REFERENCE

This application claims the benefit of U.S. Provisional Application Ser. No. 60/713,542 filed Sep. 1, 2005, the entire disclosure of which is incorporated by reference.

FIELD OF THE INVENTION

The present invention is generally related to transfer cases for use in four-wheel drive vehicles and, more particularly, to a transfer case equipped with a two-speed range clutch, an adaptive mode clutch and a clutch actuator system operable to coordinate actuation of the range clutch and the mode clutch.

BACKGROUND OF THE INVENTION

In view of the popularity of four-wheel drive vehicles, a plethora of power transfer systems are currently being utilized in vehicular driveline applications for selectively directing power (i.e., drive torque) from the powertrain to all four wheels. In many power transfer systems, a transfer case is incorporated into the driveline and is operable in a four-wheel drive mode for delivering drive torque from the powertrain to both the front and rear wheels. Many conventional transfer cases are equipped with a mode shift mechanism that can be selectively actuated to shift between a two-wheel drive mode and a four-wheel drive mode. In addition, many transfer cases also include a range shift mechanism which can be selectively actuated by the vehicle operator for shifting between four-wheel high-range and low-range drive modes.

It is also known to use "on-demand" power transfer systems for automatically biasing power between the front and rear wheels, without any input or action on the part of the vehicle operator, when traction is lost at either the front or rear wheels. Modernly, it is known to incorporate the "on-demand" feature into a transfer case by replacing the mechanically-actuated mode shift mechanism with a clutch assembly that is interactively associated with an electronic control system and a sensor arrangement. During normal road conditions, the clutch assembly is typically maintained in a non-actuated condition such that drive torque is only delivered to the rear wheels. However, when the sensors detect a low traction condition, the clutch assembly is automatically actuated to deliver drive torque to the front wheels. Moreover, the amount of drive torque transferred through the clutch assembly to the non-slipping wheels can be varied as a function of specific vehicle dynamics, as detected by the sensor arrangement. This on-demand clutch control system can also be used in full-time transfer cases to automatically bias the torque ratio across an interaxle differential.

In some two-speed on-demand transfer cases, the range shift mechanism and the clutch assembly are independently controlled by separate power-operated actuators. For example, U.S. Pat. No. 5,407,024 discloses a two-speed range shift mechanism actuated by an electric motor and a clutch assembly actuated by an electromagnetic coil. In an effort to reduce cost and complexity, some transfer cases are equipped with a single power-operated actuator that is operable to coordinate actuation of both the range shift mechanism and the clutch assembly. In particular, U.S. Pat. Nos. 5,363,938 and 5,655,986 each illustrate a transfer case equipped with a motor-driven sector having cam surfaces adapted to coordinate actuation of the range shift mechanism and the clutch assembly for establishing a plurality of distinct two-wheel and four-wheel drive modes. Other examples of transfer cases with coordinated range and mode shift systems are shown in U.S. Pat. Nos. 6,645,109, 6,783,475 and 6,802,794. While some transfer cases equipped with coordinated clutch actuation systems have proven to be commercially successful, a need exists to develop alternative systems which further advance the art related to two-speed on-demand transfer cases.

SUMMARY OF THE INVENTION

Accordingly, it is an object of the present invention to provide a transfer case equipped with a two-speed range unit, a clutch assembly and a power-operated actuation mechanism for controlling coordinated actuation of the range unit and the clutch assembly.

It is another object of this invention that the transfer case be associated with a control system for controlling operation of the power-operated actuation mechanism to establish various four-wheel high-range and low-range drive modes.

It is further object of the present invention to locate the clutch assembly across an interaxle differential so as to provide automatic torque biasing in a full-time four-wheel drive mode.

As a related object, the clutch assembly can be operably disposed between front and rear output shafts of the transfer case to provide automatic transfer of the drive torque in an on-demand four-wheel drive mode.

Another object is to provide a synchronized two-speed range unit for permitting on-the-move shifting between high-range and low-range drive modes.

According to a preferred embodiment, a transfer case is provided with a range unit, an interaxle differential, a clutch assembly, a power-operated actuation mechanism and a control system. The range unit includes a planetary gearset driven by an input shaft and a dog clutch for releasably coupling the input shaft or an output component of the planetary gearset to an input member of the interaxle differential. The interaxle differential further includes a first output member driving a first output shaft, a second output member driving a second output shaft and a gearset for transferring drive torque from the input member to the first and second output members. The clutch assembly includes a multi-plate friction clutch that is operably disposed between the first and second output shafts. The power-operated actuation mechanism includes an electric motor, a driveshaft driven by the electric motor, a range actuator assembly and a clutch actuator assembly. The range actuator assembly includes a range cam rotatively driven by the driveshaft and a shift fork for coupling the dog clutch to the range cam. Rotation of the range cam results in axial movement of the dog clutch between high-range (H), neutral (N) and low-range (L) positions. The clutch actuator assembly includes a ballramp unit and a mode cam assembly. The ballramp unit includes a first ramp plate, a second ramp plate and balls retained in aligned sets of grooves formed between the first and second ramp plates. The mode cam assembly includes a sector plate fixed to the first ramp plate and a mode cam driven by the driveshaft. The sector plate has first and second edge cams while the mode cam has first and second followers that are adapted to selectively engage the first and second edge cams of the sector plate. The control system is adapted to control the magnitude and direction of rotary motion of the driveshaft through controlled energization of the motor assembly.

The power-operated actuation system of the present invention is arranged to permit sufficient bi-directional rotation of the driveshaft to move the dog clutch between its H and L positions without causing the ballramp unit to actuate the multi-plate friction clutch. However, once the dog clutch is positively located in either of the H or L positions, continued rotation of the driveshaft causes the mode cam assembly to actuate the ballramp unit for exerting a clutch engagement force on the multi-plate friction clutch.

BRIEF DESCRIPTION OF THE DRAWINGS

Further objects, features and advantages of the present invention will become apparent from analysis of the following written specification including the appended claims, and the accompanying drawings in which:

FIGS. 5A through 5F illustrate components of the power-operated actuator mechanism of FIG. 4 shown in sequential order for actuating the mode clutch.

DETAILED DESCRIPTION OF THE PREFERRED EMBODIMENTS

Figure 1:
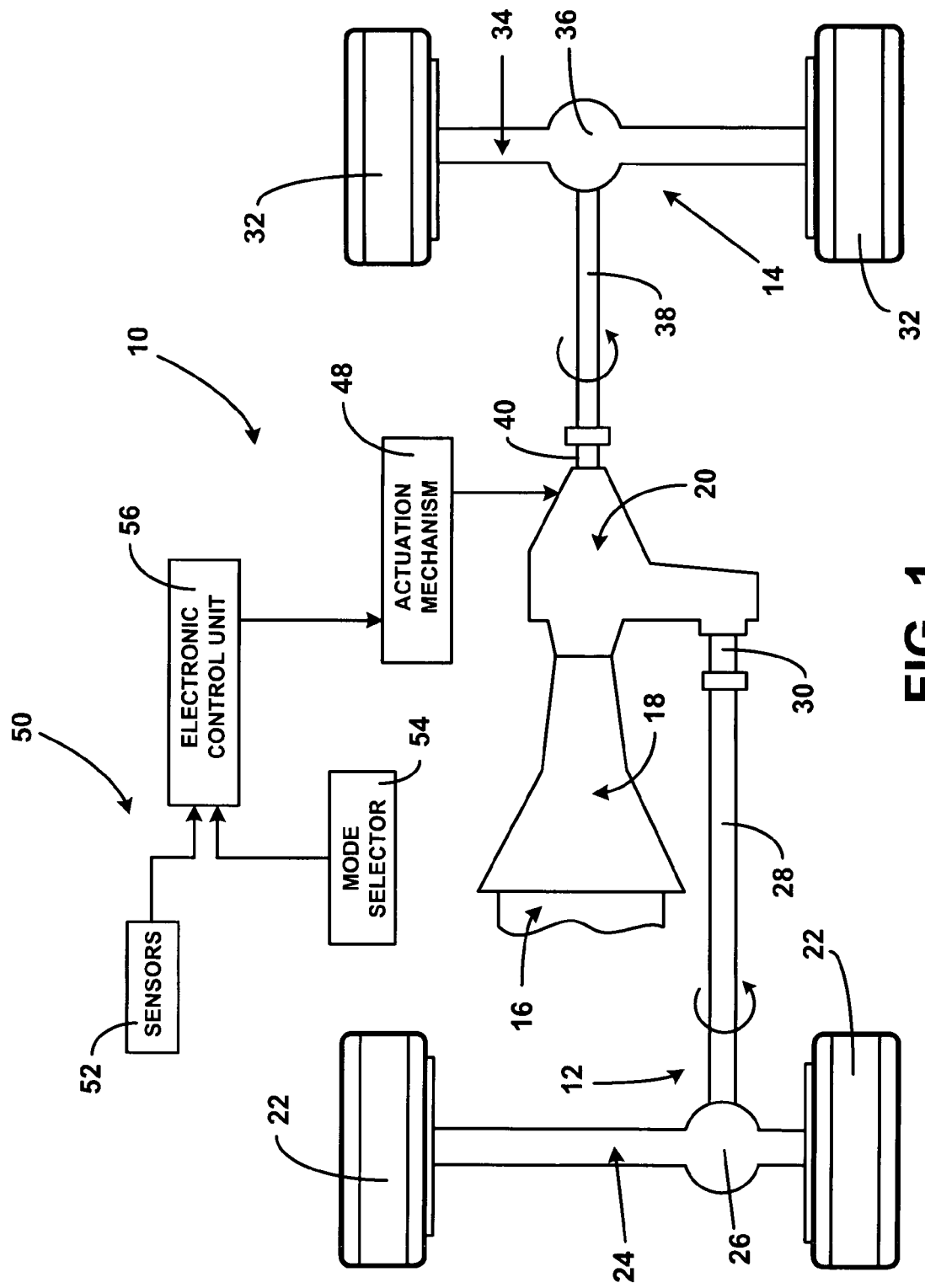
FIG. 1 is a schematic view of a four-wheel drive vehicle equipped with a transfer case and a control system according to the present invention.

Referring now to the drawings, a four-wheel drive vehicle 10 is schematically shown to include a front driveline 12 and a rear driveline 14 both drivable from a powertrain. The powertrain is shown to include an engine 16 and a transmission 18 which may be of either the manual or automatic type. In the particular embodiment shown, vehicle 10 further includes a transfer case 20 for transmitting drive torque from engine 16 and transmission 18 to front driveline 12 and rear driveline 14. Front driveline 12 includes a pair of front wheels 22 connected at opposite ends of a front axle assembly 24 having a front differential 26 that is coupled to one end of a front driveshaft 28, the opposite end of which is coupled to a front output shaft 30 of transfer case 20. Similarly, rear driveline 14 includes a pair of rear wheels 32 connected at opposite ends of a rear axle assembly 34 having a rear differential 36 coupled to one end of a rear driveshaft 38, the opposite end of which is interconnected to a rear output shaft 40 of transfer case 20.

As will be further detailed, transfer case 20 is equipped with a two-speed range unit 42, an interaxle differential 44, a mode clutch assembly 46, and a power-operated actuation mechanism 48 operable to control coordinated shifting of range unit 42 and adaptive engagement of clutch assembly 46. In addition, a control system 50 is provided for controlling actuation of actuation mechanism 48. Control system 50 includes sensors 52 for detecting operational characteristics of motor vehicle 10, a mode selector 54 for permitting the vehicle operator to select one of the available drive modes, and an electronic control unit 56 operable to generate control signals in response to input signals from sensors 52 and mode signals from mode selector 54. As will also be detailed, the control signals are sent to an electric motor assembly 58 associated with actuation mechanism 48.

Figure 2:
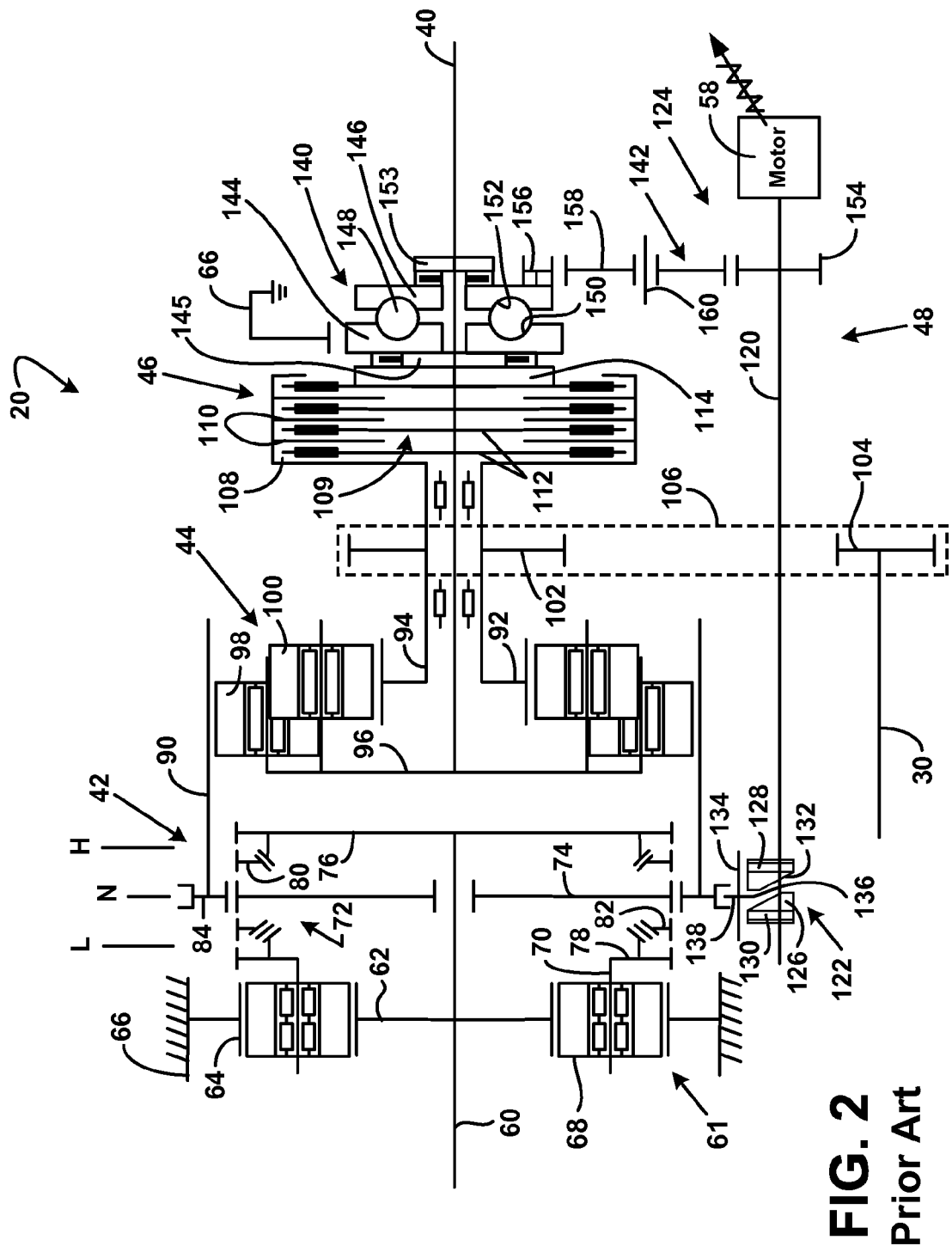
FIG. 2 is a schematic diagram of a two-speed full-time transfer case according to the present invention equipped with a range unit, a mode clutch assembly and a power-operated actuation mechanism.

With particular reference to FIG. 2, transfer case 20 is schematically shown to include an input shaft 60 adapted to be driven by the output of transmission 18. Range unit 42 includes a planetary gearset 61 having a sun gear 62 driven by input shaft 60, a ring gear 64 fixed to a stationary housing 66, and planet gears 68 rotatably supported by a planet carrier 70 and which are meshed with both sun gear 62 and ring gear 64. Range unit 42 is further shown to include a synchronized dog clutch assembly 72 having a clutch hub 74 journalled on input shaft 60, a first clutch plate 76 fixed for rotation with input shaft 60 and a second clutch plate 78 fixed for rotation with planet carrier 70. Synchronized dog clutch assembly 72 further includes a first synchronizer 80 disposed between clutch hub 74 and first clutch plate 76, a second synchronizer 82 disposed between clutch hub 74 and second clutch plate 78 and a shift collar 84 that is splined for rotation with and bi-directional axial sliding movement on clutch hub 74.

Shift collar 84 is shown in FIG. 2 in its neutral (N) position where it is disengaged from both first clutch plate 76 and second clutch plate 78. Shift collar 84 is moveable from its N position to a high-range (H) position whereat shift collar 84 is coupled to first clutch plate 76 and is driven at a direct speed ratio relative to input shaft 60. In contrast, shift collar 84 can be moved from its N position to a low-range (L) position whereat shift collar 84 is coupled to second clutch plate 78 and is driven by planet carrier 70 at a reduced speed ratio relative to input shaft 60. First synchronizer 80 functions to establish speed synchronization between shift collar 84 and input shaft 60 during movement of shift collar 84 toward its H position. Likewise, second synchronizer 82 functions to establish speed synchronization between shift collar 84 and planet carrier 70 during movement of shift collar 84 toward its L position. It will be appreciated that range unit 42 is merely exemplary of any suitable two-speed arrangement with a moveable clutch that is capable of establishing at least two different drive connections.

Interaxle differential 44 includes an input member driven by shift collar 84, a first output member driving rear output shaft 40 and a second output member operably arranged to drive front output shaft 30. In particular, differential 44 includes an annulus gear 90 fixed for common rotation with shift collar 84, a sun gear 92 fixed to a quill shaft 94 rotatably supported on rear output shaft 40, and a pinion carrier 96 fixed to rear output shaft 40 and which rotatably supports meshed pairs of first pinion gears 98 and second pinion gears 100. In addition, first pinion gears 98 are meshed with annulus gear 90 and second pinion gears 100 are meshed with sun gear 92. As such, driven rotation of annulus gear 90 (at either of the direct or reduced speed ratios) causes drive torque to be transmitted to rear output shaft 40 via pinion carrier 96 and to quill shaft 94 via sun gear 92. Drive torque is transferred from quill shaft 94 to front output shaft 30 via a chain drive assembly which includes a drive sprocket 102 fixed to quill shaft 94, a driven sprocket 104 fixed to front output shaft 30 and a drive chain 106 that is meshed with sprockets 102 and 104. Based on the particular configuration of interaxle differential 44, a specific torque distribution ratio is established (i.e., 50/50, 64/36) between rear output shaft 40 and front output shaft 30.

With continued reference to FIG. 2, mode clutch assembly 46 is shown to include a multi-plate friction clutch having a clutch drum 108 fixed to quill shaft 94 and a clutch pack 109. Clutch pack 109 has a plurality of outer clutch rings 110 splined for rotation with clutch drum 108 which are interleaved with a plurality of inner clutch rings 112 splined for rotation with rear output shaft 40. Mode clutch assembly 46 also includes an axially moveable apply plate 114 for applying a clutch engagement force on clutch pack 109.

Power-operated actuation mechanism 48 is operable to cause movement of shift collar 84 between its three distinct positions as well as to generate the clutch engagement force exerted on clutch pack 109 of mode clutch assembly 46. In its most basic sense, actuation mechanism 48 includes motor assembly 58, a driveshaft 120 rotatively driven by the output of motor assembly 58, a range actuator assembly 122 and a mode actuator assembly 124. Motor assembly 58 is preferably an electric motor equipped with an encoder capable of accurately sensing the rotated position of driveshaft 120. Range actuator assembly 122 includes a range cam 126 that is fixed for rotation with driveshaft 120. Range cam 126 is cylindrical and includes a continuous groove having a high-range dwell segment 128, a low-range dwell segment 130, and a spiral intermediate actuation segment 132 connecting laterally-spaced dwell segments 128 and 130. Range actuator assembly 122 further includes a range fork 134 having a follower segment 136 retained in the cam groove in range cam 126 and a fork segment 138 retained in an annular groove formed in shift collar 84.

As will be appreciated, rotation of range cam 126 results in axial movement of shift collar 84 due to retention of follower segment 136 in spiral groove segment 132. Specifically, rotation of driveshaft 120 in a first direction causes concurrent rotation of range cam 126 which, in turn, causes follower segment 136 to move within intermediate groove segment 132 until shift collar 84 is located in its H position. At this position, follower segment 136 enters high-range dwell groove segment 128 which permits continued rotation of driveshaft 120 in the first direction while shift collar 84 is retained in its H position such that the high-range drive connection is established and maintained between input shaft 60 and annulus gear 90. Thereafter, rotation of driveshaft 120 and range cam 126 in the opposite second direction causes follower segment 136 to exit high-range dwell groove segment 128 and re-enter intermediate groove segment 132 for causing shift collar 84 to begin moving from its H position toward its L position. Upon continued rotation of range cam 126 in the second direction, follower segment 136 exits intermediate groove segment 132 and enters low-range dwell groove segment 30 for locating shift collar 84 in its L position and establishing the low-range drive connection between planet carrier 70 and annulus gear 90.

Mode actuator assembly 124 is also driven by motor assembly 58 and includes a ballramp unit 140 and a gear assembly 142. Ballramp unit 140 includes a first ramp plate 144, a second ramp plate 146 and a plurality of balls 148 disposed in aligned sets of ramped grooves 150 and 152 formed in corresponding face surfaces of ramp plates 144 and 146. First ramp plate 144 is non-rotatably secured to housing 66 and is supported for bi-directional axial movement. Specifically, first ramp plate 144 is shown to coaxially surround rear output shaft 40 and is arranged to move axially for exerting the clutch engagement force on apply plate 114 for frictionally engaging clutch pack 109. A thrust bearing 145 is shown located between apply plate 114 and first ramp plate 144 for permitting relative rotation therebetween. Second ramp plate 146 also coaxially surrounds rear output shaft 40 and is supported for rotation relative to first ramp plate 144. Second ramp plate 146 is axially restrained relative to rear output shaft 40 via a backing plate 153 and another thrust bearing is shown located therebetween. As such, relative rotation between first and second ramp plates 144 and 146 causes balls 148 to travel within ramped grooves 150 and 152 which, in turn, acts to control the axial position of second ramp plate 146 and apply plate 114 relative to clutch pack 109, thereby controlling the magnitude of the clutch engagement force exerted thereon.

Gear assembly 142 includes a first gear 154 fixed for rotation with driveshaft 120, a second gear 156 fixed to second ramp plate 146 and a third gear 158 rotatably supported on an idlershaft 160 and which is meshed with both first gear 154 and second gear 156. Preferably, second gear 156 is an arcuate gear segment that is formed integrally with, or rigidly secured to, an outer face surface of second ramp plate 146. The profile of ramped grooves 150 and 152 and the gear ratio established by gear assembly 142 between driveshaft 120 and second ramp plate 146 are designed to permit bi-directional rotation of driveshaft 120 through a range of travel sufficient to permit shift collar 84 to move between its H and L range positions without any significant clutch engagement force being transmitted by ballramp unit 140 to clutch assembly 46. In particular, a biasing device (not shown) is provided to angularly bias ramp plates 144 and 146 to a position whereat balls 148 are centrally located in cam grooves 150 and 152 and first ramp plate 144 is axially located in a "released" position. With first ramp plate in its released position, no significant clutch engagement force is applied to clutch pack 109 such that mode clutch assembly 46 is considered to be in a fully released condition.

However, additional bi-directional rotation of driveshaft 120 causes axial movement of second ramp plate 146 between an "adapt-ready" position and a "locked" position while dwell groove segments 128 and 130 in range cam 126 function to maintain shift collar 84 in either of its H and L range positions. With second ramp plate 146 in the adapt-ready position, a predetermined minimum clutch engagement force is exerted on clutch pack 109. Preferably, this minimal clutch engagement force applies a preload on clutch pack 109 so as to eliminate driveline clunk and permit instantaneous clutch actuation. Conversely, a maximum clutch engagement force is exerted on clutch pack 109 and clutch assembly 46 is considered to be fully engaged when second ramp plate is located in its locked position. Thus, by varying the axial position of second ramp plate 146 between its adapt-ready and locked position, the torque bias across differential 44 can be continuously modulated to provide automatic control of clutch assembly 46 in a range between its released and fully engaged conditions.

Control system 50 is provided to control the rotated position of driveshaft 120 in response to the mode signal delivered to ECU 56 by mode selector 54 and the sensor input signals sent by sensors 52. While sensors 52 can provide numerous indicators (i.e., shaft speeds, vehicle speed, acceleration/throttle position, brake status, etc.), it is contemplated that clutch assembly 46 is controlled, at a minimum, in response the magnitude of interaxle slip (ΔRPM) between output shafts 40 and 30. According to one vehicular application, mode selector 54 permits selection of an Automatic Full-Time four-wheel high-range (AUTO-4WH) drive mode, a Neutral mode and a Locked four-wheel low-range (LOCK-4WL) drive mode. In the AUTO-4WH mode, shift collar 84 is located in its H position and the torque biasing generated by clutch assembly 46 is continuously modulated based on value of the sensor signals. In the LOCK-4WL drive mode, shift collar 84 is located in its L position and clutch assembly 46 is fully engaged. In the Neutral mode, shift collar 84 is located in its N position and clutch assembly 46 is released. Obviously, other available drive modes can also be provided if desired. For example, a Locked four-wheel high-range (LOCK-4WH) drive mode can be established by locating shift collar 84 in its H position and fully engaging clutch assembly 46.

While actuation mechanism 48 has been disclosed in association with a full-time transfer case, it will be understood that differential 44 could be eliminated such that clutch assembly 46 functions to modulate the drive torque transferred from rear output shaft 40 to front output shaft 30 to establish an "on-demand" four-wheel drive mode. A modified version of transfer case 20 is shown and identified in FIG. 3 as transfer case 20A which is operable to define on-demand four-wheel drive modes. Basically, shift collar 84 now includes a drive ring 164 that is splined to a drive plate 166 fixed for rotation with rear output shaft 40. Likewise, clutch assembly 46 is now arranged to transfer drive torque from rear output shaft 40 to front output shaft 30. Again, motor assembly 58 is operable to coordinate movement of shift collar 84 and ballramp unit 140 to establish various locked and on-demand four-wheel drive modes.

Figure 3:
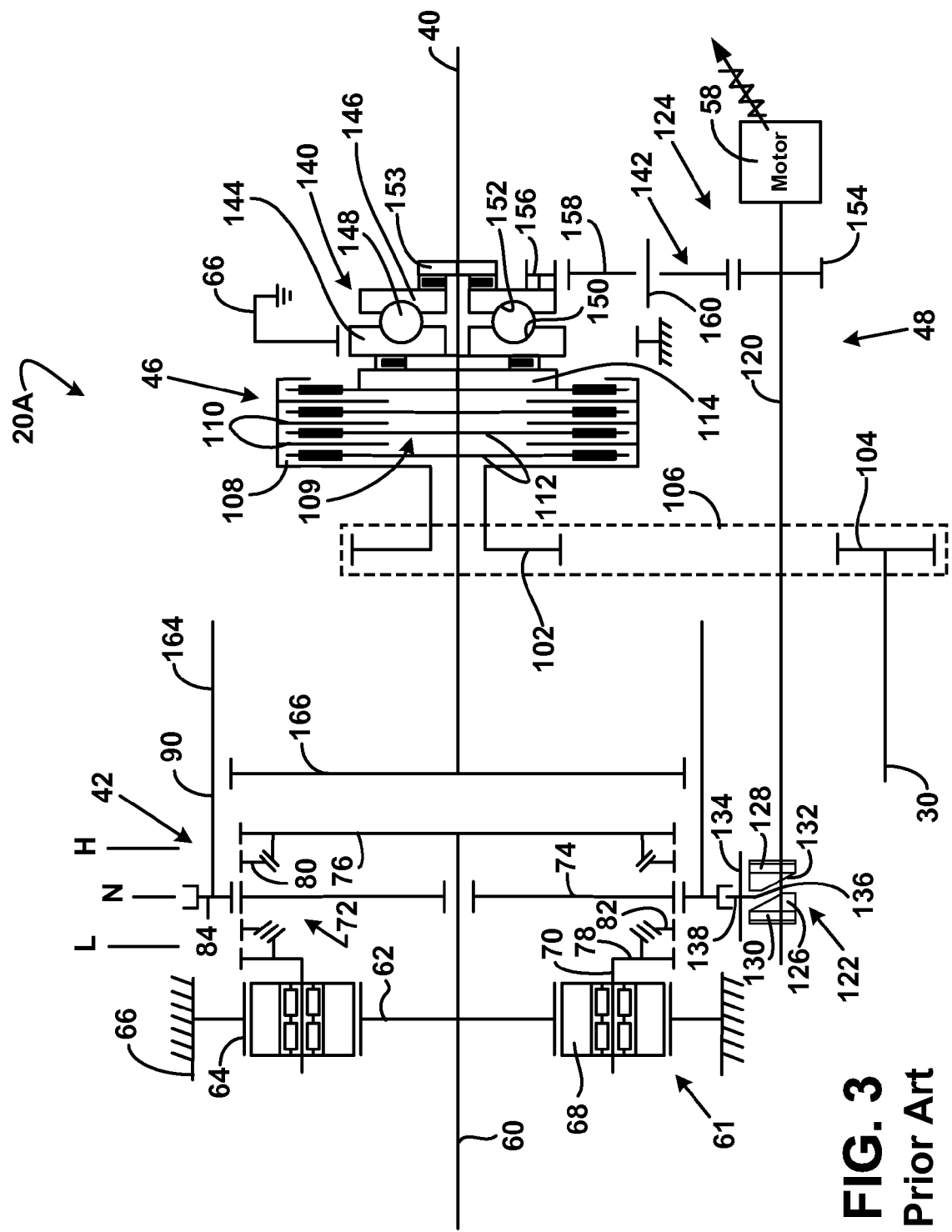
FIG. 3 is a schematic of a two-speed on-demand transfer case according to an alternative preferred embodiment of the present invention.

When on-demand transfer case 20A of FIG. 3 is used in association with vehicle 10 of FIG. 1, mode selector 54 would permit selection of a variety of available modes including, for example, a two-wheel high-range (2WH) drive mode, an on-demand four-wheel high-range (AUTO-4WH) drive mode, a part-time four-wheel high-range (LOCK-4WH) drive mode, a Neutral mode, and a part-time four-wheel low-range (LOCK-4WH) drive mode. Specifically, in the 2WH drive mode, shift collar 84 would be located in its H position and clutch assembly 46 would be released such that all drive torque is delivered to rear output shaft 40. In the AUTO-4WH drive mode, shift collar 84 would be located in its H position and clutch assembly 46 would be continuously modulated based on the value of the sensor signals to vary the torque distribution ratio between rear output shaft 40 and front output shaft 30 in a range between 100:0 and 50:50. In the LOCK-4WH drive position, shift collar 84 would still be located in its H position and clutch assembly 46 would be fully engaged to effectively couple front output shaft 30 to rear output shaft 40. Similarly, when the LOCK-4WL drive mode is selected, controller 56 controls actuation mechanism 48 to locate shift collar 84 in its L position while fully engaging clutch assembly 46.

Figure 4:
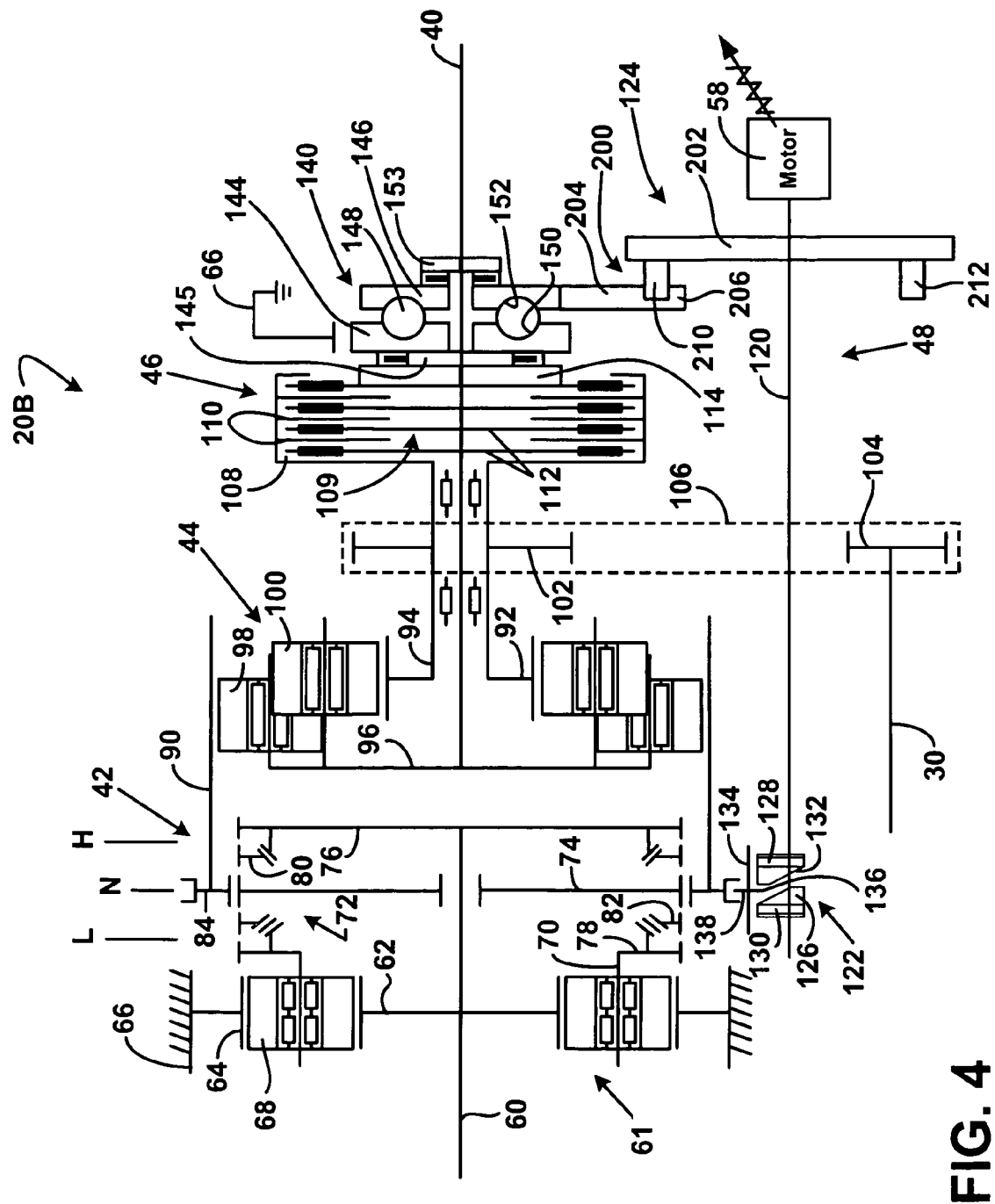
FIG. 4 is a schematic of a full-time two-speed transfer case similar to that shown in FIG. 2 except that an alternative power-operated actuation mechanism is shown.

Referring to FIG. 4, a transfer case 20B is schematically shown to be generally similar to full-time transfer case 20 of FIG. 2 except that clutch actuator assembly 124 of power-operated actuation mechanism 48 is now equipped with a mode cam assembly 200 in place of gear assembly 142. As such, common reference numerals are used to identify those components of transfer case 20B that are similar to components of transfer case 20 previously described herein. As seen, mode cam assembly 200 includes a mode cam 202 that is fixed for common rotation with driveshaft 120 and a sector plate 204 that is fixed to second ramp plate 146 of ballramp unit 140. As best seen from FIGS. 5A-5F, sector plate 204 is shown to extend outwardly from second ramp plate 146 and includes a first edge cam surface 206 and a second edge cam surface 208. Likewise, mode cam 202 is shown to include a first follower 210 adapted to selectively engage first cam edge surface 206 and a second follower 212 adapted to selectively engage second cam edge surface 208.

Figure 5B:
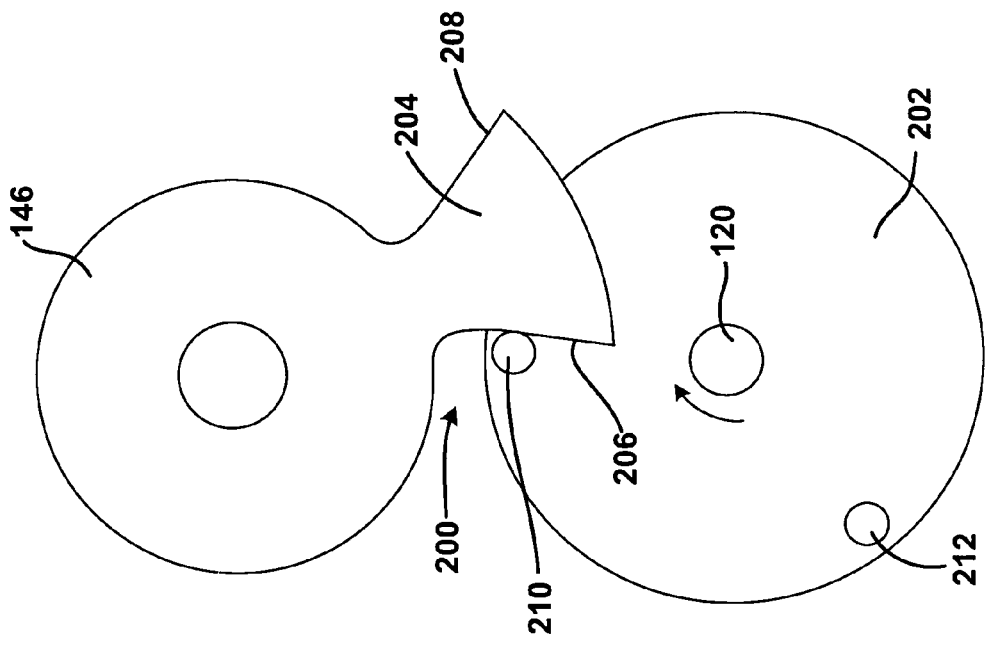
Figure 5A:
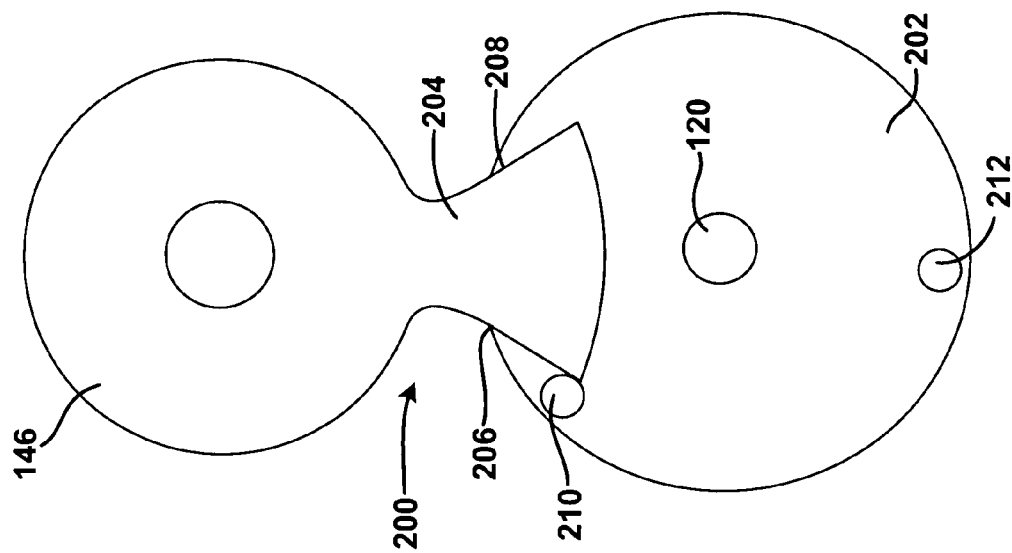

FIG. 5A illustrates the rotated position of mode cam 202 caused by rotation of driveshaft 120 in its first direction to a position whereat range cam 126 has caused shift collar 84 to be located in its H range position with follower segment 136 of range fork 134 located at the entrance portion of high-range dwell groove segment 128. Likewise, second ramp plate 146 of ballramp unit 140 is rotated to a position whereat balls 148 are centrally located in cam grooves 150 and 152 such that first ramp plate 144 is axially located in its released position.

Figure 5C:
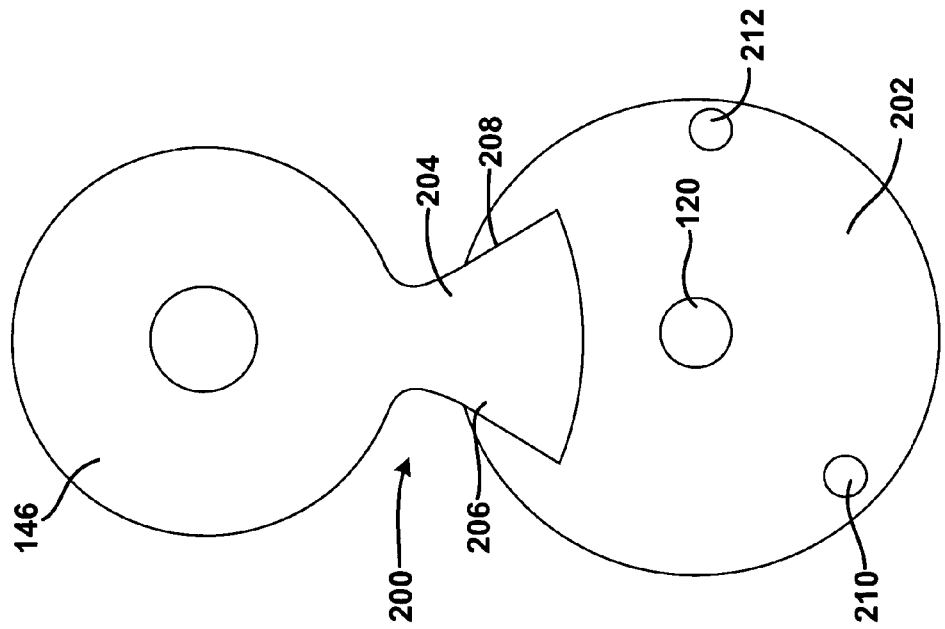

FIGS. 5B and 5C show continued rotation of driveshaft 120 in its first direction for causing first follower 210 on mode cam 202 to ride along first cam surface 206 and cause concurrent rotation of sector plate 204 and second ramp plate 146. As previously disclosed, such rotation of second ramp plate 146 causes ballramp unit 140 to axially displace first ramp plate 144 from its released position through its adapt-ready position (FIG. 5B) toward its locked position (FIG. 5C). As seen, rotation of mode cam 202 through a range of about 90° is required to rotate second ramp plate 146 of ballramp unit 140 through a range of about 45° of angular travel to cause axial movement of first ramp plate 144 between its released and locked positions. Such limited angular travel of mode cam 202 functions to permit adaptive actuation of mode clutch assembly 46 while dog clutch 72 maintains the high-range drive connection between input shaft 60 and the input to interaxle differential 44.

In operation, differential 44 acts as an open or unrestricted differential when mode cam 202 locates second ramp plate 146 of ballramp unit 140 in the angular position shown in FIG. 5A. In contrast, differential 44 is locked when mode cam 202 locates second ramp plate 146 in the angular position shown in FIG. 5C, such as when the LOCK-4WH drive mode is selected. Adaptive torque distribution control is provided by controlling bi-directional angular movement of second ramp plate 146 between the positions shown in FIGS. 5B and 5C when the AUTO-4WH drive mode is selected. As noted, high-range dwell groove segment 130 accommodates rotation of range cam 126 with driveshaft 120 to maintain shift collar 84 in its H range position during such actuation of mode clutch assembly 46.

Figure 5D:
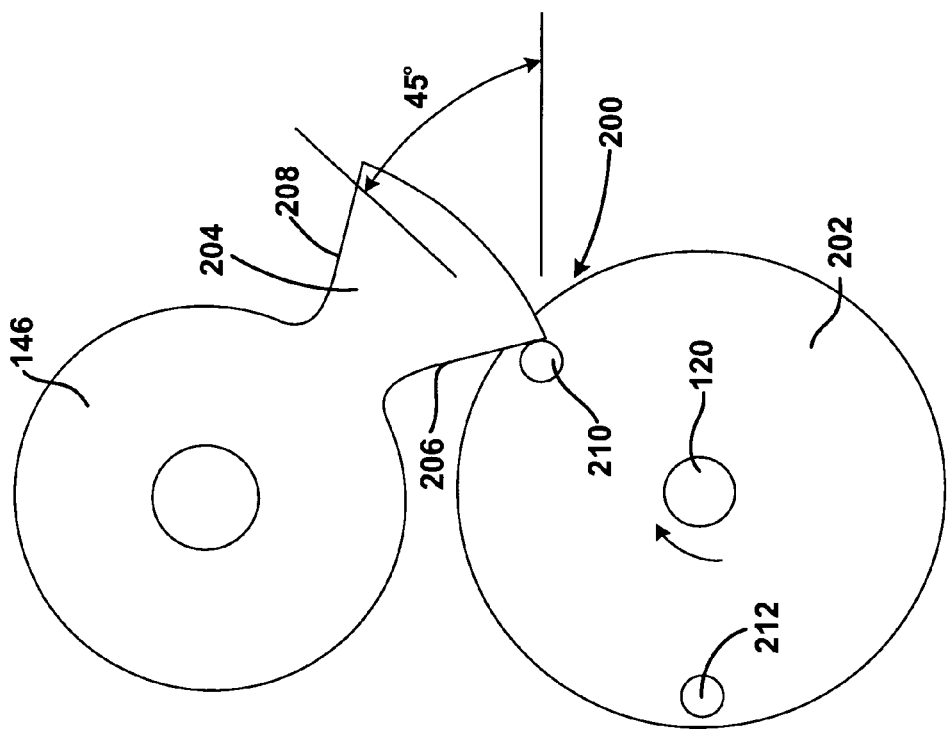

When it is desired to shift range unit 42 into it Neutral mode, mode cam 202 is rotated by driveshaft 120 to the position shown in FIG. 5D. As such, second ramp plate 146 is angularly positioned such that balls 148 are centrally located in grooves 150 and 152 for axially locating first ramp plate 144 in its released position so as to fully release engagement of mode clutch assembly 46. The angular spacing between first follower 210 and second follower 212 is selected to permit driveshaft 120 to rotate range cam 126 without either of followers 210 and 212 on mode cam 202 engaging its corresponding cam surface 206 and 208 of sector plate 204 during range shifting between the high-range position (FIG. 5A), the Neutral position (FIG. 5D) and the low-range position (FIG. 5E), thereby permitting mode clutch assembly 46 to be maintained in its fully released condition during range shifting.

FIG. 5E illustrates the rotated position of mode cam 202 caused by rotation of driveshaft 120 in its second direction to a position whereat range cam 126 has caused shift collar 84 to be located in its L range position with follower segment 136 of range fork 134 located at the entrance of low-range dwell groove segment 130. As mentioned, second ramp plate 146 is located in a position whereat balls 148 are centrally located in grooves 150 and 152 such that first ramp plate 144 is axially in its released position. FIG. 5F shows that continued rotation of driveshaft 120 in the second direction causes second follower 212 on mode cam 202 to engage second cam edge 208 and concurrently rotate sector plate 204 and second ramp plate 146. As noted, such rotation of second ramp plate 146 causes ballramp unit 140 to axially displace first ramp plate 144 from its released position (FIG. 5E) toward its locked position (FIG. 5F). Again, rotation of drive plate 202 in the range of about 90° is required to rotate second ramp plate 146 through a range of about 45° of angular travel to cause axial movement of first ramp plate 144 between its released and locked positions. Furthermore, FIG. 5F illustrates the positioning required to establish the LOCK-4WL drive mode.

The above reference embodiments clearly set forth the novel and unobvious features, structure and/or function of the present invention. However, one skilled in the art will appreciate that equivalent elements and/or arrangements made be used which will be covered by the scope of the following claims.

What is claimed is:

1. A transfer case comprising:
an input shaft;
first and second output shafts;
an interaxle differential having an input member, a first output member coupled to said first output shaft, a second output member coupled to said second output shaft, and a gearset interconnecting said input member to said first and second output members;
a range unit driven by said input shaft and having an output component driven at a reduced speed relative to said input shaft;
a dog clutch moveable between a first range position and a second range position, said dog clutch is operable in its first range position to releasably couple said input shaft to said input member of said differential for establishing a high-range drive connection therebetween, and said dog clutch is operable in its second range position to releasably couple said output component of said range unit to said input member of said differential for establishing a low-range drive connection therebetween,
a friction clutch operably disposed between said any two members of said interaxle differential;
a ballramp unit having a first plate, a second plate and rollers engaging a cam surface formed between said first and second plates, said first plate is adapted to move axially relative to said friction clutch in response to rotary movement of said second plate between a first mode position whereat a minimum clutch engagement force is exerted on said friction clutch and a second mode position for whereat a maximum clutch engagement force is exerted on said friction clutch; and
a power-operated actuation mechanism for controlling coordinated movement of said dog clutch between its first and second range positions and said second plate between its first and second mode positions, said actuation mechanism including a motor, a driveshaft rotatively driven by said motor, a mode cam assembly operably connecting said second plate to said driveshaft, a range cam driven by said driveshaft and a shift fork having a first segment engaging said range cam and a second segment coupled to said dog clutch, said mode cam assembly including a mode cam driven by said driveshaft and a sector plate coupled to said second plate, said mode cam having first and second followers and said sector plate having a first cam surface engageable with said first follower and a second cam surface engageable with said second follower.

2. The transfer case of claim 1 wherein rotation of said driveshaft in a first direction causes concurrent rotation of said range cam which cause movement of said dog clutch toward its first range position while rotation of said driveshaft in a second direction causes said range cam to move said dog clutch toward its second range position.

3. The transfer case of claim 2 wherein said dog clutch moves between its first and second range positions while said second plate is located in its first mode position such that said friction clutch is released during movement of said dog clutch.

4. The transfer case of claim 3 wherein continued rotation of said driveshaft in said first direction when said dog clutch is located in its first range position causes said first follower on said mode cam to engage said first cam surface on said sector plate for causing rotation of said second plate from its first mode position whereat said friction clutch is released toward its second mode position whereat said friction clutch is fully engaged.

5. The transfer case of claim 4 further comprising a control system for controlling the axial position of said first plate in response to angular movement of said second plate between its first and second mode positions to modulate the engagement of said friction clutch.

6. The transfer case of claim 3 wherein continued rotation of said driveshaft in said second direction when said dog clutch is located in its second range position causes said second follower on said mode cam to engage said second cam surface on said sector plate for causing rotation of said second plate from its first mode position toward its second mode position.

7. A transfer case comprising:
an input shaft;
first and second output shafts;
a range unit driven by said input shaft and having an output component driven at a reduced speed relative to said input shaft;
a dog clutch operable in a first range position to couple said input shaft to said first output shaft for establishing a high-range drive connection, said dog clutch is further operable in a second range position to couple said output component of said range unit to said first output shaft for establishing a low-range drive connection;
a mode clutch including a clutch pack operably disposed between said first and second output shafts and an apply plate moveable between a first mode position whereat a minimum clutch engagement force is exerted on said clutch pack and a second mode position whereat a maximum clutch engagement force is exerted on said clutch pack;
an actuation mechanism for coordinating movement of said dog clutch and said apply plate, said actuation mechanism including a motor driving a driveshaft, a range actuator assembly driven by said driveshaft for moving said dog clutch between its first and second range positions, and a mode actuator assembly driven by said driveshaft for moving said apply plate between its first and second mode positions, said driveshaft being rotatable through a first range of travel for causing said range actuator assembly to move said dog clutch between its first and second range positions while said mode actuator assembly maintains said apply plate in its first mode position, a second range of travel for causing said range actuator assembly to maintain said dog clutch in its first range position while said mode actuator assembly moves said apply plate between its first and second mode positions, and a third range of travel for causing said range actuator assembly to maintain said dog clutch in its second range position while said mode actuator assembly moves said apply plate between its first and second mode positions; and
a control system for controlling actuation of said motor;
wherein said mode actuator assembly includes a mode cam driven by said driveshaft and having first and second followers, and a clutch operator for converting rotary movement of said mode cam into axial movement of said apply plate, said clutch operator including a first cam member having a first cam surface engageable with said first follower and a second cam surface engageable with said second follower, a second cam member disposed between said first cam member and said apply plate, and rollers disposed between said first and second cam members.

8. The transfer case of claim 7 wherein said first range of rotary travel of said driveshaft equals about 180° and said second and third ranges of rotary travel of said driveshaft each equal about 90°.

9. The transfer case of claim 7 wherein said range actuator assembly comprises:
   a range cam coupled for rotation with said driveshaft;
   a shift fork coupled to said dog clutch; and
   a mechanism interconnecting said shift fork to said range cam which is operable to convert rotary movement of said range cam into axial movement of said shift fork for moving said dog clutch between its first and second range positions.

10. The transfer case of claim 9 wherein said mechanism includes a follower secured to said shift fork which extends into a groove formed in said range cam, said groove including a high-range dwell segment, a low-range dwell segment, and a shift segment interconnecting said high-range and low-range dwell segments, said shift segment is configured to cause axial movement of said dog clutch between its first and second range positions during rotation of said driveshaft through its first range of rotary travel, said high-range dwell segment is configured to maintain said dog clutch in its first range position during rotation of said driveshaft caused through its second range of rotary travel, and said low-range dwell segment is configured to maintain said dog clutch in its second range position during rotation of said driveshaft through its third range of rotary travel.

11. The transfer case of claim 7 wherein said mode cam surrounds and is couple to said driveshaft, wherein said first cam member surrounds said first output shaft and includes a sector portion which defines said first and second cam surfaces, wherein said second cam member surrounds said first output shaft adjacent to said first cam member, and wherein said rollers engage a ramp surface formed between said first and second cam members.

12. The transfer case of claim 7 wherein said first and second followers are displaced from engagement with said first and second cam surfaces during rotation of said driveshaft through its first range of travel, wherein said first follower engages said first cam surface and causes said first cam member to rotate relative to said second member such that said second cam member moves axially to move said apply plate between its first and second mode positions in response to rotation of said driveshaft through its second range of travel, and wherein said second follower engages said second cam surface and causes said first cam member to rotate relative to said second cam member such that said second cam member moves said apply plate between its first and second positions in response to rotation of said driveshaft through its third range of angular travel.

13. A transfer case comprising:
   an input shaft;
   first and second output shafts;
   a range unit driven by said input shaft and having an output component driven at a reduced speed relative to said input shaft;
   a dog clutch moveable between a first range position and a second range position, said dog clutch is operable in its first range position to releasably couple said first output shaft for establishing a high-range drive connection therebetween, and said dog clutch is operable in its second range position to releasably couple said output component of said range unit to said first output shaft for establishing a low-range drive connection therebetween,
   a friction clutch operably disposed between said first and second output shafts;
   a ballramp unit having a first plate, a second plate and rollers engaging a cam surface formed between said first and second plates, said first plate is adapted to move axially relative to said friction clutch in response to rotary movement of said second plate between a first mode position whereat a minimum clutch engagement force is exerted on said friction clutch and a second mode position for whereat a maximum clutch engagement force is exerted on said friction clutch; and
   a power-operated actuation mechanism for controlling coordinated movement of said dog clutch between its first and second range positions and said second plate between its first and second mode positions, said actuation mechanism including a motor, a driveshaft rotatively driven by said motor, a mode cam assembly connecting said second plate to said driveshaft, a range cam driven by said driveshaft and a shift fork having a first segment engaging said range cam and a second segment coupled to said dog clutch, said mode cam assembly including a mode cam driven by said driveshaft and a sector plate coupled to said second plate, said mode cam having first and second follower and said sector plate having a first cam surface engageable with said first followers and a second cam surface engageable with said second follower.

14. The transfer case of claim 13 wherein said first segment of said shift fork is retained in a groove formed in said range cam, wherein said groove in said range cam includes a first circumferential groove, a second circumferential groove and a spiral groove connecting said first and second circumferential grooves, whereby rotation of said driveshaft in a first direction causes concurrent rotation of said range cam which cause movement of said dog clutch toward its first range position while rotation of said driveshaft in a second direction causes said range cam to move said dog clutch toward its second range position.

15. The transfer case of claim 14 wherein said dog clutch moves between its first and second range positions while said second plate is in its first mode position such that said friction clutch is released during movement of said dog clutch.

16. The transfer case of claim 15 wherein continued rotation of said driveshaft in a first direction when said dog clutch is in its first range position causes said first segment of said shift fork to enter said first circumferential groove and said first follower on said mode cam to engage said first cam surface and cause rotation of said sector plate such that said second plate moves from its first mode position whereat said friction clutch is released toward its second mode position whereat said friction clutch is fully engaged.

17. The transfer case of claim 16 further comprising a control system for controlling the position of said second plate between its first and second mode positions to modulate the engagement of said friction clutch.

18. A transfer case, comprising:
   an input shaft;
   first and second output shafts;
   a range unit driven by said input shaft;
   a range clutch for releaseably coupling said first output shaft to one of said input shaft and said range unit;

a mode clutch for providing variable engagement between said first and second output shafts;

an actuation mechanism for coordinating actuation of said range clutch and said mode clutch, said actuation mechanism including a driveshaft, a power-operated device for bi-directionally rotating said driveshaft, a range actuator assembly for converting rotation of said driveshaft into translation of said range clutch, and a mode actuator assembly for converting rotation of said driveshaft into a clutch engagement force exerted on said mode clutch, said mode actuator assembly including a cam mechanism having a first cam member operable to exert said clutch engagement force on said mode clutch in response to rotation of a second cam member, a sector member coupled to said second cam member and having a first and second cam surfaces, and a mode cam driven by said driveshaft and having a first follower engageable with said first cam surface and a second follower engageable with said second cam surface.

19. The transfer case of claim 18 wherein said range clutch is axially moveable between first and second range positions, said range clutch is operable in its first range position to releaseably couple said first output shaft to said input shaft for establishing a high-range drive connection therebetween, and said range clutch is operable in its second range position to releaseably couple said first output shaft to said range unit for establishing a low-range drive connection between said input shaft and said first output shaft, and wherein said range actuator assembly includes a range cam fixed for rotation with said driveshaft and a shift fork configured to convert rotation of said range cam into axial translation of said range clutch.

20. The transfer case of claim 19 wherein said mode clutch is a multi-plate friction clutch operably disposed between said first and second output shafts, and wherein said first and second cam members of said cam mechanism define first and second cam plates aligned to surround said first output shaft, said first cam plate is axially moveable relative to said friction clutch in response to rotary movement of said second cam plate between a first mode position whereat a minimum clutch engagement force is exerted on said friction clutch and a second mode position whereat a maximum clutch engagement force is exerted on said friction clutch.

21. The transfer case of claim 20 wherein rotation of said driveshaft in a first direction causes concurrent rotation of said range cam which cause movement of said range clutch toward its first range position while rotation of said driveshaft in a second direction causes said range cam to move said range clutch toward its second range position, and wherein said range clutch moves between its first and second range positions while said second cam plate is located in its first mode position such that said friction clutch is released during movement of said range clutch.

22. The transfer case of claim 20 wherein said cam mechanism further includes a ramp surface formed on at least one of said first and second cam plates, and rollers engaging said ramp surface.

23. The transfer case of claim 21 wherein continued rotation of said driveshaft in said second direction when said range clutch is located in its second range position causes second follower on said mode cam to engage said second cam surface on said sector member for causing rotation of said second cam plate from its first mode position toward its second mode position.

24. The transfer case of claim 22 wherein continued rotation of said driveshaft in said first direction when said range clutch is located in its first range position causes said first follower on said mode cam to engage said first cam surface on said sector member for causing said second cam plate from its first mode position toward its second mode position.

25. The transfer case of claim 18 wherein said first and second followers are displaced from engagement with said first and second cam surfaces during rotation of said driveshaft through a first range of travel, wherein said first follower engages said first cam surface and causes said second cam member to rotate relative to said first cam member such that said first cam member moves axially relative to said friction clutch in response to rotation of said driveshaft through a second range of travel, and wherein said second follower engages said second cam surface and causes said second cam member to rotate relative to said first cam member such that said first cam member moves axially relative to said friction clutch in response to rotation of said driveshaft through a third range of angular travel.

26. The transfer case of claim 18 further including a differential assembly having an input member, a first output member coupled to said first output shaft, a second output member coupled to said second output shaft, and a gearset interconnecting said input member to said first and second output members, and wherein said range clutch is operable for releaseably coupling said input member of said differential assembly to one of said input shaft and said range unit.

* * * * *